United States Patent [19]
Chen et al.

[11] Patent Number: 5,907,713
[45] Date of Patent: May 25, 1999

[54] CONTROL METHOD FOR A HARD DISK DRIVE AND A DATA PROCESSOR REDUCING POWER CONSUMPTION OF THE HARD DISK DRIVE

[75] Inventors: Chenchao Chen; Yoshimi Tachibana, both of Tokyo, Japan

[73] Assignee: Kabushiki Kaisha Toshiba, Kawasaki, Japan

[21] Appl. No.: 08/721,062

[22] Filed: Sep. 26, 1996

[30] Foreign Application Priority Data

Feb. 29, 1996 [JP] Japan ................................. 8-043547

[51] Int. Cl.⁶ ........................................................ G06F 1/32
[52] U.S. Cl. ................. 395/750.03; 395/750.01; 395/750.05; 711/4
[58] Field of Search ................... 395/750.01–750.08; 364/492; 711/4, 112, 114

[56] References Cited

U.S. PATENT DOCUMENTS 5,392,438  2/1995  Gunji ................................. 395/750.05
5,493,670  2/1996  Douglis et al. ..................... 395/750.06
5,532,935  7/1996  Ninomiya et al. ....................... 364/492

FOREIGN PATENT DOCUMENTS 6-19593    1/1994  Japan.
7-121973   5/1995  Japan.

Primary Examiner—Ayaz R. Sheikh
Assistant Examiner—Ario Etienne
Attorney, Agent, or Firm—Finnegan, Henderson, Farabow, Garrett & Dunner, L.L.P.

[57] ABSTRACT

System and method for a computer system having a hard disk drive (HDD) having a function of stopping the disk driving motor of the HDD after an elapse of a predetermine period of time after accessing the HDD. A use/non-use state of the computer system is monitored while the system is being powered. Different shut off times are set based on whether a use or non-use state is detected. After the set periods of time, computer shut down occurs.

4 Claims, 5 Drawing Sheets

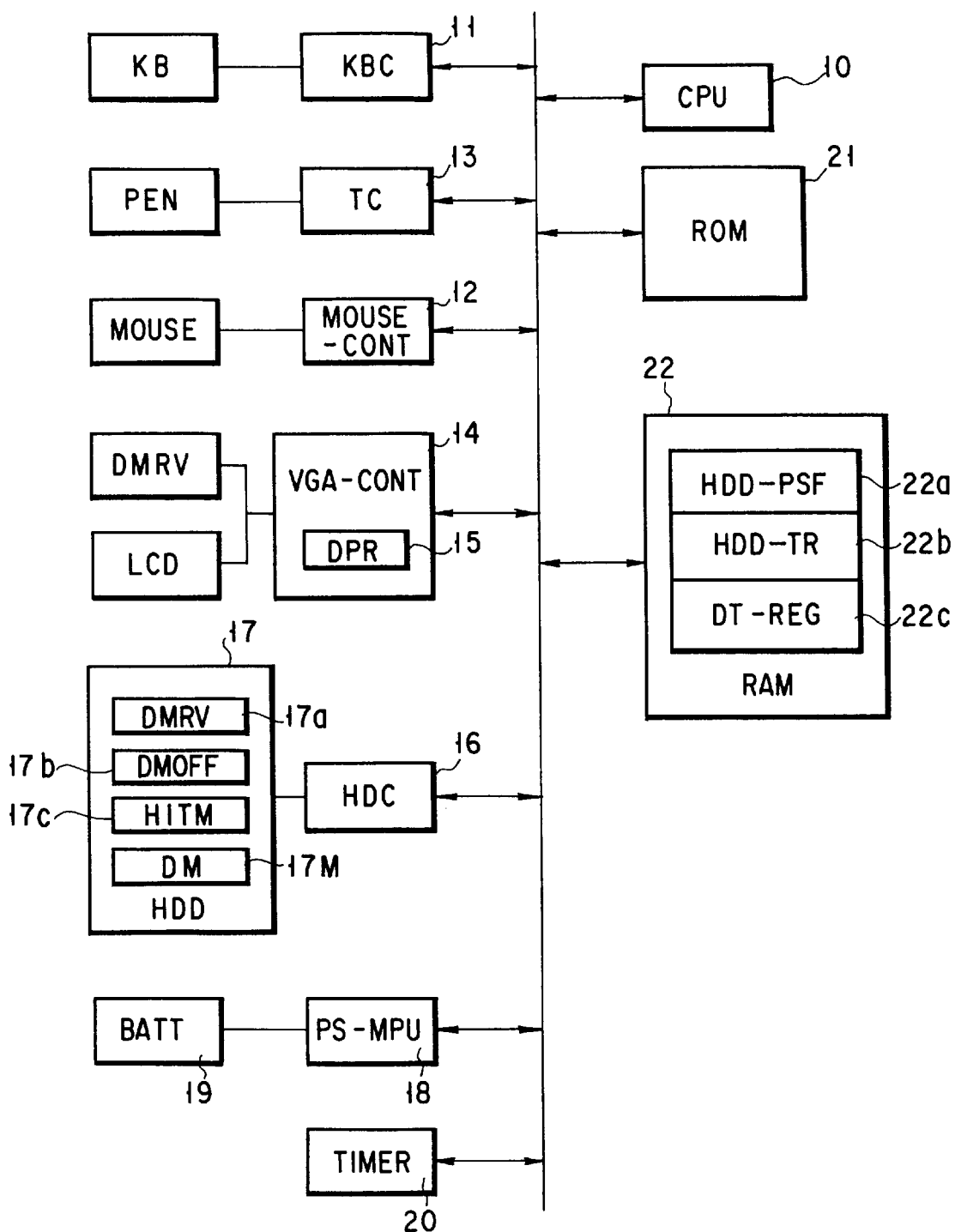
F I G. 1

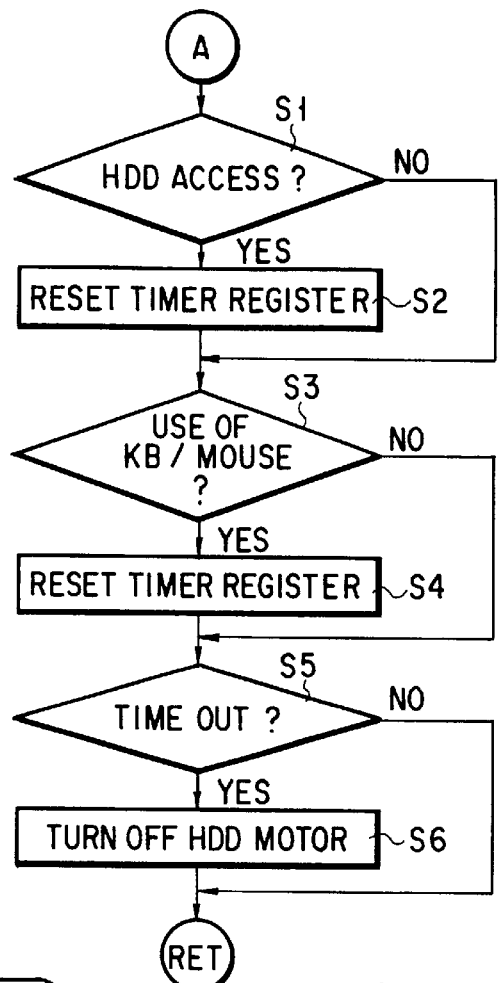
FIG. 2
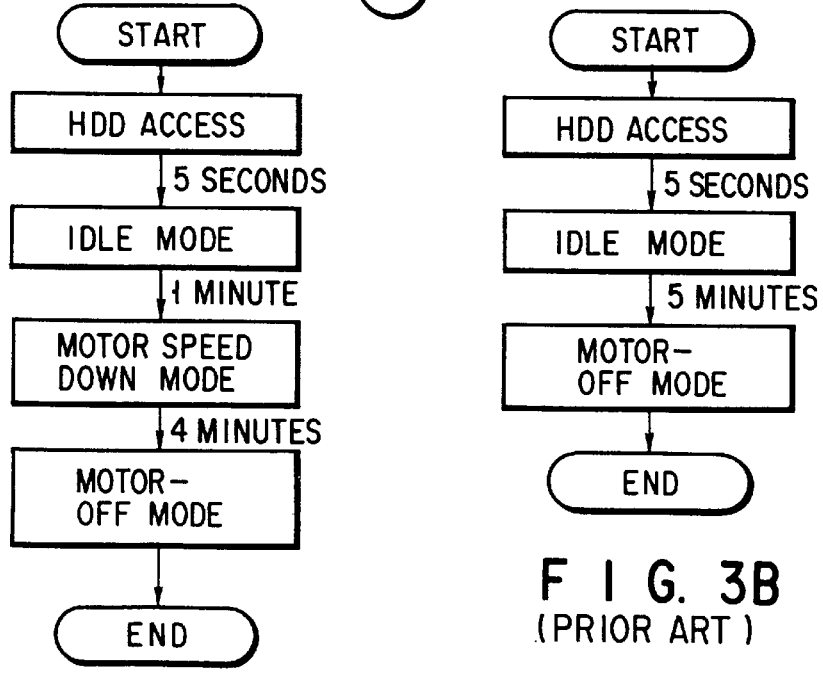
FIG. 3A
FIG. 3B (PRIOR ART)

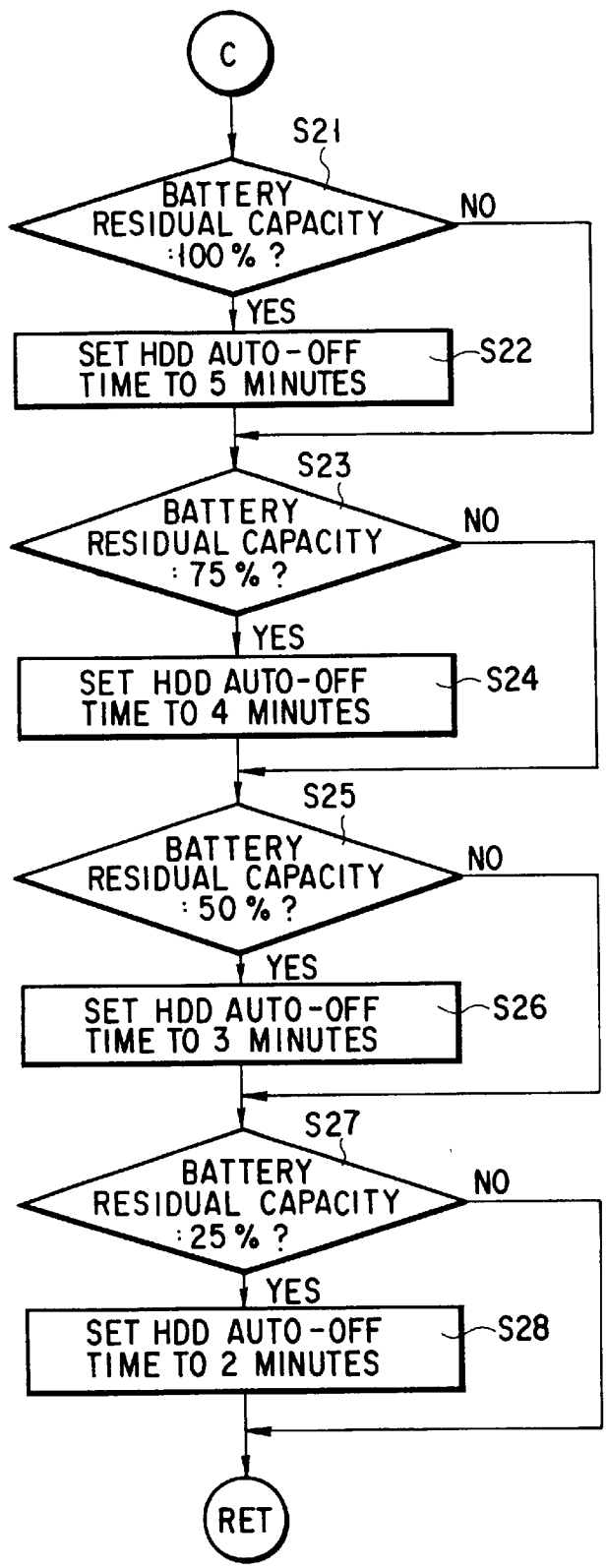
F I G. 7

CONTROL METHOD FOR A HARD DISK DRIVE AND A DATA PROCESSOR REDUCING POWER CONSUMPTION OF THE HARD DISK DRIVE

BACKGROUND OF THE INVENTION

1. Field of the Invention

The present invention relates to a controlling method for a hard disk drive (HDD) and a data processor provided with the HDD, in particular to a controlling method for the HDD and a data processor reducing power consumption of the HDD.

2. Description of the Related Art

Various kinds of power-saving measures are implemented in order to suppress wasteful power consumption when the battery is operated in the portable type information processing appliances which are capable of being driven by a battery-drive.

Also, various kinds of power-saving measures are implemented in the information processing measures such as the personal computer in which the hard disc drive (HDD) is loaded.

Conventionally, as the power-saving measure, there exists a method for saving power by stopping a motor for driving HDD, when HDD is not accessed during predetermined period of times.

However, in the power saving method, when the motor of HDD once stops, in order to restart the motor, it requires latency of 3 to 5 seconds extends, accordingly there is a problem that it is not easy to use therefor.

In order to start the HDD motor, when the motor starts, exceedingly large starting current becomes necessary. The starting current is exceedingly larger than the normal driving current when the motor rotates with constant motor speed. There is accordingly a problem that the large starting current becomes adverse effect for the power saving. Further there is a problem that the life of the HDD becomes short life, if the motor of the HDD stops at frequent intervals for power saving thereof.

From these problems, it is incapable of being expected so large in a power saving to shorten the period of established time for controlling a period of time of motor-off, in case of shifting to the motor-off after accessing of the HDD.

There is a power saving measure as the conventional power saving measure of the HDD that the motor is transferred from the driving condition to the idle condition when the motor stands off-condition.

There is a problem that the power saving measure for power consumption of the HDD by motor-off becomes adverse effect when the motor-off is repeated frequently as stated above. In the saving measure of the power consumption in which the saving measure comes into the automatic idle after disk accessing, since the off controlling of the motor is not implemented, a large power saving effect can not be expected.

Conventionally, there is an operational function for reducing the power consumption in that the motor is automatically transferred from the driving condition to the idle condition, at the time when 5 seconds elapse from termination of read/write of HDD. However, with regard to this operational function, the automatic idle timer which controls the automatic idle period of time of the HDD is fixed to 5 seconds, accordingly, there is a problem that wasteful power consumption is consumed during 5 seconds period of time when the motor comes into the idle condition from the HDD accessing.

Further conventionally, in the personal computer which is capable of being driven by the battery, respective display and HDD, in which the procession for the power saving is implemented individually. Namely, with regard to the display, the input operating condition of the key board/mouse is supervised by the exclusive timer, and if there is no input, the operational function of display-off is provided by an operating system. With regard to HDD, the power saving operational function such as motor-off and so forth are implemented due to the access-supervision of the HDD by using the individual exclusive timer.

At this period of time, when the timer of the HDD is established for a longer period of time rather than the timer of the display, if the user does not employ the personal computer more than established period of the time, although the power saving operational function of the display operates, the power saving operational function of the HDD does not operates, consequently, improvement of the power saving effect is not attained.

Furthermore, in the conventional power saving method, the HDD is supervised by the timer, and if the HDD is not accessed within the predetermined period of the time, the power saving is performed by stopping the motor of the HDD. At this time, the automatic stop period of time established to the timer is always fixed period of the time. When the personal computer is employed by the battery, if the automatic stop period of time is shortened, power consumption of the battery is reduced, however the extent of easy-to-use is deteriorated. While if the automatic stop period of time is lengthened, the extent of easy-to-use is improvement, the power consumption of the battery is increased.

Thus, conventionally, since the automatic stop-period of time of the HDD is fixed, there are problems that the attempt of the power saving might result in poor extent of easy-to-use for the user, while when the extent of easy-to-use for the user is taken into consideration, high effective power saving is incapable of being expected.

As described above, in the conventional data processing apparatus, since the automatic stop-period of time of the HDD is fixed, there are problems that the attempt of the power saving might result in poor extent of easy-to-use for the user, while when the extent of easy-to-use for the user is taken into consideration, high effective power saving is incapable of being expected.

SUMMARY OF THE INVENTION

An object of the present invention is to provide a control method for a hard disk drive and a data processor which would be capable of being improved both of power saving and extent of easy-to-use in the data processor provided with the HDD.

According to a first aspect of the present invention, a control method of a hard disk drive having a function of stopping a disk driving motor after an elapse of a predetermined period of time after accessing a hard disk drive (HDD), comprises the computer steps of: monitoring a use/non-use state of a device provided with the HDD; setting an automatic-off time of the disk driving motor to a first time period when the device is in the use state; and setting the automatic-off time of the disk driving motor to a second time period when the device is in the non-use state.

According to a second aspect of the present invention, a data processing apparatus provided with a hard disk drive, comprises: means for automatically stopping the disk driving motor after an elapse of a predetermined period of time after accessing the hard disk drive (HDD); means for monitoring use/non-use state of the data processor; and means for varying the automatic-off time of the disk driving motor according to the use state and the non-use state of the data processor.

According to a third aspect of the present invention, the apparatus comprises: a timer for clocking a time-out time in order to control the disk driving motor so as to be automatically stopped; means for resetting the timer at the time when the HDD comes into an access state; and means for determining the use/non-use state by monitoring an input state of the data processing apparatus; and means for resetting the timer at the time when the determining means determines the use state of the data processing apparatus.

According to a fourth aspect of the present invention, a hard disk drive control method, comprises the computer steps of: setting a hard disk drive (HDD) in an idle mode; setting the HDD in the idle state to a motor rotation down mode, the motor rotation down mode reducing a speed of the disk driving motor of the HDD to drive the HDD at a lower speed; and setting the HDD in the motor rotation down mode to a motor-off mode ceasing the disk driving motor.

According to a fifth aspect of the present invention, a data processing apparatus provided with a hard disk drive, comprises: means for setting an idle mode having A time period after accessing the HDD; means for setting a-motor rotation down mode having B time period after the idle mode; and means for setting the motor rotation down mode to a motor-off mode.

According to a sixth aspect of the present invention, a hard disk drive control method, comprises the computer steps of: accessing the hard disk drive (HDD); computing an access frequencies of the HDD; setting an automatic idling time of the HDD dynamically in accordance with the access frequencies; and setting the HDD to an idle mode after an elapse of the set automatic idling time.

According to a seventh aspect of the present invention, a hard disk drive control method of a computer provided with a function of automatically ceasing a disk rotating motor after an elapse of a predetermined time-out period set by a power-off time after accessing the hard disk drive, and an auto-off function of a display unit, comprises setting the power-off timer a time-out period shorter than the predetermined time-out period in synchronism with the execution of the auto-off function of the display unit.

According to an eighth aspect of the present invention, a hard disk drive control method of a battery-drivable computer provided with a function of automatically ceasing a disk driving motor after an elapse of a predetermined period of time after accessing the hard disk drive, comprises varying the automatic ceasing time of the disk driving motor depending on a residual capacity of the battery when the computer is driven by the battery.

According to a ninth aspect of the present invention, a battery-drivable data processing apparatus provided with a hard disk drive, comprises: means for monitoring a residual capacity of the battery when the apparatus is driven by the battery; means for automatically ceasing a disk driving motor after an elapse of a certain set time after accessing the hard disk drive; and varying the set time for automatically ceasing the disk driving motor depending on a residual capacity of the battery when the hard disk drive is driven by the battery.

According to a tenth aspect of the present invention, a battery-drivable data processing apparatus provided with a hard disk drive, comprises: means for monitoring a residual capacity of a battery when the apparatus is driven by the battery; means for automatically ceasing a disk driving motor after an elapse of a set time after accessing the hard disk drive; and means for varying the set time of the idling mode depending on a change of a residual capacity of the battery when the apparatus is driven by the battery.

According to an eleventh aspect of the present invention, a battery-drivable data processing apparatus, comprises: a hard disk drive having a motor rotation down mode driving a disk driving motor at a lower speed between an idle mode and a motor-off mode; means for monitoring a residual capacity of a battery when the apparatus is driven by the battery; and varying the set time of the motor rotation down mode depending on a change of the residual capacity of the battery when the apparatus is driven by the battery.

According to a twelfth aspect of the present invention, a battery-drivable data processing apparatus, comprises: a hard disk drive having a motor rotation down mode driving a disk driving motor at a lower speed between an idle mode and a motor-off mode; means for monitoring a residual capacity of the battery when the apparatus is driven by the battery; and varying the set times of the idle mode and the motor rotation down mode depending on the residual capacity of the battery when the apparatus is driven by the battery.

According to a thirteenth aspect of the present invention, an article of manufacture comprises: a computer usable medium having computer readable program code means embodied therein for causing an auto-off time of a disk rotating motor of a battery-driven hard disk drive to be set variably, the computer readable program code means in the article of manufacture, comprising: a computer readable program code means for causing the computer to monitor an in-use state and a non-in-use state of the computer provided with the hard disk drive; and a computer readable program code means for causing the auto-off time of the display unit to be set variably depending on the monitored in-use state and the non-in-use state.

According to a fourteenth aspect of the present invention, an article of manufacture comprises: a computer usable medium having computer readable program code means embodied therein for causing a hard disk drive to be rotated in various modes, the computer readable program code means in the article of manufacture, comprising: a computer readable program code means for causing the hard disk drive to be set in an idle mode; a computer readable program code means for causing the hard disk drive in the idle mode to be set in a motor rotation down mode, the motor rotation down mode driving a motor of the hard disk drive lower than that of the idle mode; and a computer readable program code means for causing the hard disk drive in the motor rotation down mode to be set in a motor-off mode in which a rotation of the motor is ceased.

According to a fifteenth aspect of the present invention, an article of manufacture comprises:

a computer usable medium having computer readable program code means embodied therein for causing an auto-off time of a disk rotating motor of a battery-driven hard disk drive to be set variably depending on a residual capacity of the battery, the computer readable program code means in the article of manufacture, comprising: a computer readable program code means for causing the computer to monitor the residual capacity of the battery; and a computer readable program code means for causing the auto-off time of the display unit to be set variably depending on the monitored residual capacity of the battery.

As described above, according to the present invention, there is provided an operational function to supervise whether or not the user implements the input operation (key board/mouse), in addition to the conventional access-supervision of the HDD, in order to judge whether or not it leads the motor of the HDD to stop. When the user operates the key board or the mouse and so forth, the probability of the HDD-access is high. Accordingly, it leads the HDD-motor not to stop by resetting the HDD-motor-off timer. Due to the above controlling operation, even if the timer of the HDD-motor-off is established shortly, frequency of the HDD-motor-off can be decreased by only input operation of the user. Further no input operation is performed by the user, since it can be used the motor-off-timer whose established period of the time is short, the HDD-motor can be stopped earlier, with the result that the power consumption is capable of being saved.

Further, in the present invention, the motor driving speed down mode intervenes between the idle mode and the motor-off mode. The motor driving speed down mode is a large effective mode rather than the idle mode. The motor driving speed down mode prevents from wrong matter caused by restarting of the motor-off as described above. Power saving effect is attained in such a way that the motor driving speed down mode is shifted during short timer period of time as the power-saving mode before entering the motor-off mode.

Furthermore, in the present invention, by shortening the automatic idle period of time (period of time from HDD access to idle condition), above described wasteful power consumption can be saved.

Moreover, in the present invention, a power saving operational function of the display provided by the operating system is supervised, and a generation of the display auto-off is judged as the system unused-condition, it can establish a short period of time-out time of the HDD motor-off, with the result that, it causes the power-saving effect to improve. In the power saving operational function of the display provided by the operating system, the input such as the key board, mouse and so forth are supervised, if there is no input during the period of established time, it causes the auto-off of the display to implement. Since the generation of the auto-off of the display signifies the fact that the user does not operate the input operation during specific period of times, the probability of no access is high. For this reason, in order to stop the disk driving motor of the HDD as soon as possible, short period of time-out time is established to the HDD motor-off timer.

Moreover, in the present invention, after suppressing the influence of the extent of easy-to-use for the user, in order to lengthen the life of the battery as long as possible, the automatic stop period of time of the HDD is varied due to the remaining amount of the battery. The remaining amount of the battery is always supervised, and detected that the changes of the remaining amount battery from 100% state, 75% state, 50% state, to 25% state, so that it causes the HDD-automatic-stop period of time to change in accordance with the detecting timing of the above each remaining amount. The shorter the HDD-automatic-stop period of time is, the more the effect of the power-saving is improved. The extent of easy-to-use for the user is aggravated. While, the longer the HDD-automatic-stop period of time is, the less the effect of the power-saving is improved. The effect to the extent of easy-to-use is diminished. For this reasons, when the battery remaining- amount is 100%, the automatic-stop period of time is lengthen, while the HDD-automatic-stop period of time is gradually shortened in proportion to reduction of the remaining amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a construction of a principal portion according to an embodiment when the present invention is applied to a personal computer;

FIG. 2 is a flow-chart showing processing procedure according to the first embodiment of the present invention;

FIGS. 3A and 3B illustrate flow-charts showing processing procedure according to the second embodiment of the present invention in comparison with the conventional processing procedure;

FIG. 7 is a flow-chart showing a processing procedure of the fifth embodiment according to the invention.

DETAILED DESCRIPTION OF THE PREFERRED EMBODIMENTS

Figure 4A:
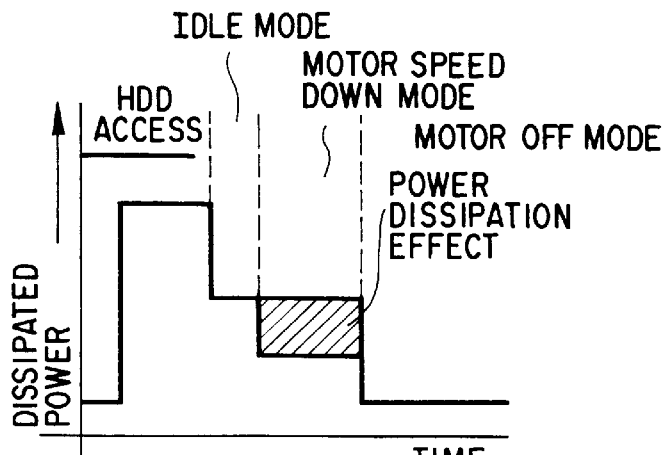
FIGS. 4A and 4B illustrate views showing operation steps according to the second embodiment of the present invention.

A preferred embodiment of the invention will now be described in detail referring to the accompanying drawings.

FIG. 1 is a block diagram showing a construction of a principal portion according to an embodiment when the present invention is applied to a personal computer.

In FIG. 1, A CPU 10 controls a whole present system. Here, HDD access-frequency-calculating program (FA) is stored in ROM 21, HDD power-save program is stored in a RAM 22. Driving control of HDD 16 for saving power of HDD is implemented with provision for HDD power-save flag (HDD-PSF) 22a, HDD timer register 22b, and display timer register 22c and so forth referred to be controlled in accordance with the HDD access-frequency-calculating program in the ROM 10 and, the HDD power save program in the RAM 22, as shown in FIGS. 2 to 7.

A key board controller (KBC) 11 controls a key input of the key board. A key input interruption is generated due to pushing down of the key on the key board (KB) by the user. The HDD timer register 22b provided within the RAM, display timer register 22c and so forth are reset due to the controlling program realizing the present invention by the key input interruption.

A mouse controller (Mouse-CONT) 12 controls the input of the mouse (Mouse). The user implements the input interruption by operation of the mouse (quick operation of button). The HDD timer register 22b provided within the RAM, display timer register 22c and so forth are reset due to the controlling program which can implement the present invention by the mouse operating input interruption.

A tablet controller (TC) 13 controls a coordinate input accompanied by operation of a pen (PEN). The HDD timer register 22b provided within the RAM, display timer register 22c and so forth are reset due to the controlling program which can implement the present invention by the pen operating input interruption.

A display controlling Device (VGA-CONT) 14 controls display output on the display (LCD) with regard to the display data developed on the video-RAM (VRAM) under the controlling of CPU 10. Here, predetermined display power save processing is implemented such as brightness decreasing (for example, back-light illumination-down), display interruption (for example, back-light-off), and so forth, in accordance with the content of the display power save register (DPR) 15.

A hard disk controller (hereinafter referring to HDC) read/write-accesses a HDD 17 under the control of the CPU 10. Here, the HDC performs disk drive control including an establishing control of various registers for the HDD power-saving.

A HDD 17 is read/write-accessed under the control of the HDC 16. Here, there are provided, as disk drive control registers for power saving, a motor driving speed control register (DMRV) 17a used for down-control of driving speed of a disk driving motor 17M, a motor-Off register (DMOFF) 17b used for stop-control of the disk driving motor 17M, a head idle time register (HITM) 17c used for setting a shift-time when the HDD-head shifts to idle mode.

A micro processor (PS-MPU) 18 controls the power source of a system. Here, the micro processor (PS-MPU) 18 performs ON/OFF-control of the system power source, CHARGE/DISCHARGE-control of a battery 19, and check of battery residual capacity.

A battery (BATT) 19 feeds power source to the system when the battery operates. The battery 19 is charge/discharge-controlled by the micro processor (PS-MPU) 18 for controlling the power source, and the battery residual capacity is checked thereby. Such battery residual capacity obtained by the battery-check is notified to the CPU 10.

A timer 20 performs a timer-count process in accordance with the set value under the control of the CPU 10. The timer 20 down-counts the motor-Off register (DMOFF) 17b within the HDD 17, and the display timer register 22c within the ROM 22, and so forth due to the timer-interruption.

A ROM 21 stores a control program such as a BIOS or the like.

A RAM 22 is read/write-controlled under the control of the CPU 10. Here, an HDD power saving flag (HDD-PSF) 22a, a HDD timer register 22b, a display timer register (DT-REG) 22c and so forth are provided for controlling of the HDD power saving as shown in FIGS. 2 to 7. Furthermore, there is provided a storing area, in the RAM 22, for the HDD power saving program including monitor processing routine of system-use/non-use state, which executes the processing for the HDD power-saving as shown in FIGS. 2 to 7.

The power-saving flag (HDD-PSF) 22a is a flag which indicates the status of the present HDD timer. Here, when "0" the HDD timer register 22b is employed for driving speed controlling (down controlling) of the disk driving motor 17M, while when "1" the HDD timer register 22b is employed for motor-off controlling (clocking of automatic stop period of time) of the disk driving motor 17M.

The HDD timer register 22b is counted down by the timer 20, at the same time, there is operated the input-device such as key board (KB), the mouse (Mouse), the pen (PEN) by the user. Each time the CPU 10 recognize that the system is in the use state, on all such occasions, the HDD timer register is reset. When the HDD timer register 22b is counted down to "0", the motor-driving speed control register (DMRV) 17a or the motor-Off register (DMOFF) 17b is set in accordance with established values ("0", "1" ) of the HDD power-saving flag (HDD-PSF) 22a.

The display timer register 22c is counted down by the timer 20, at the same time, there is operated the input-device such as key board (KB), the mouse (Mouse), the pen (PEN) by the user. Each time the CPU 10 recognize that the system is in the use-state, the HDD timer register is reset. When the HDD timer register 22b is counted down to "0", the display power-saving register (DPR) 15 is set, a power-saving mode of the display such as back-light-off and so forth fulfills its operational function.

FIG. 2 is a flow chart showing processing procedure according to the first embodiment of the present invention. In addition to the access monitoring of the HDD which has been executed conventionally, the use/non-use state of the system is monitored depending on whether or not a user operates an input device such as a keyboard (KB), a mouse (Mouse) and a pen (PEN). When it is recognized that the user uses the system, the probability of the HDD access is determined to be high. Based on this determination, the HDD timer register 22b is reset, in order not to automatically stop the disk driving motor 17M, (returning to establishing condition of initial value for an automatic-stop period of time).

FIGS. 3A and 3B illustrate a flowchart showing processing procedure according to the second embodiment of the present invention in comparison with the conventional processing procedure. FIG. 3A is a flowchart showing processing procedure according to the second embodiment of the present invention. FIG. 3B is a flowchart showing processing procedure of the conventional one.

Figure 4B:
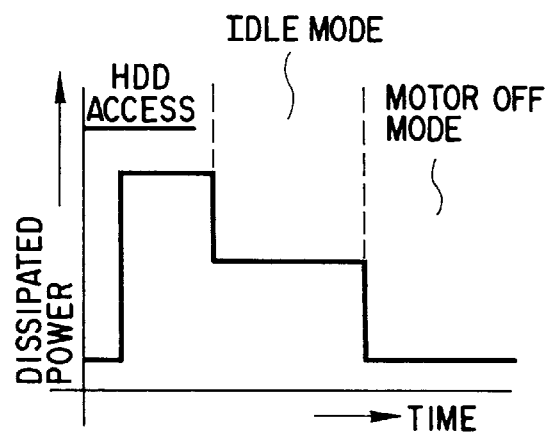

FIGS. 4A and 4B illustrate an operation explanatory view showing a power-saving control according to the second embodiment of the present invention in comparison with the conventional power-saving control. FIG. 4A is a timing chart showing the power-saving control according to the second embodiment of the present invention. FIG. 4B is a timing chart showing the conventional power-saving control.

In the second embodiment of the present invention, a motor driving speed down mode which aims at saving power by decreasing the driving speed of the disk driving motor 17M, intervenes between the idle mode after HDD accessing and the motor-off mode.

The motor driving speed down mode has a larger efficiency compared to the idle mode. The motor driving speed down mode prevents from drawbacks caused by restarting of the motor-off as described above. Power saving effect is attained in such a way that the motor driving speed down mode is shifted during short timer period of time as the power saving mode before entering the motor-off mode.

Figure 5A:
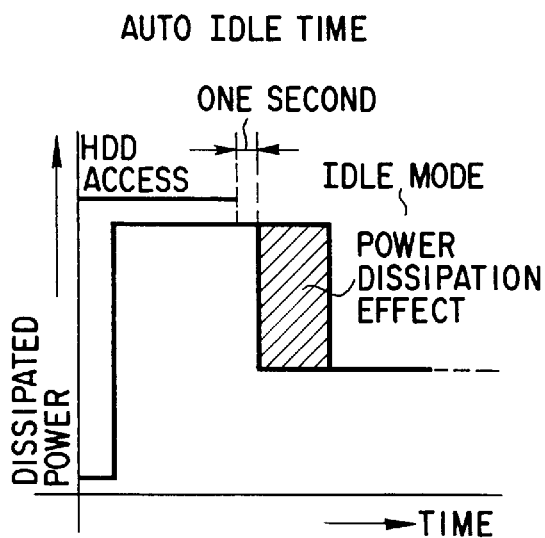
FIGS. 5A and 5B illustrate views showing operation steps according to the third embodiment of the present invention.
Figure 5B:
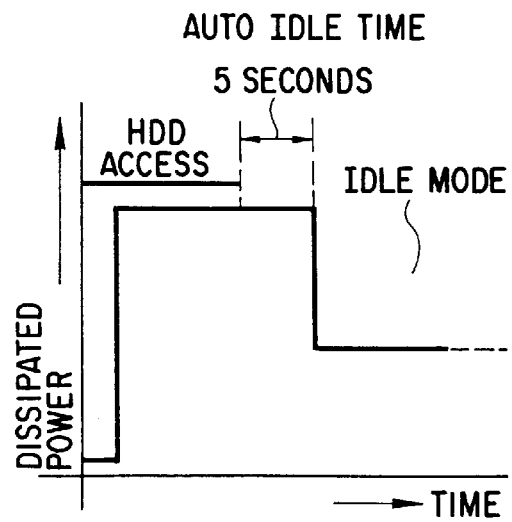

FIGS. 5A and 5B illustrate an operation explanatory view showing an power saving control according to the third embodiment of the present invention in comparison with the conventional power saving control. FIG. 5A is a timing chart showing the power saving control according to the third embodiment of the present invention. FIG. 5B is a timing chart showing the conventional power saving control.

The power saving control according to the third embodiment aims at saving power by shortening the period of time from HDD access to idle condition (automatic idle period of time). Here, the power saving effect is attained in such a way that it shorten the automatic idle period of time from 5 seconds to 1 seconds.

The mode in which the automatic idle period of time is chosen correspondingly to the remaining capacity of the battery 19 (battery capacity) when the battery operates, or correspondingly to the condition when the system is used/unused. For example, when the battery capacity reduces less than 50%, it causes the automatic idle period of time to shorten, or when the system is used-condition, the conventional automatic idle period of time is selected, and so forth, thus by choosing the suitable selection, the power-saving effect is capable of being attained in more convenient condition for extent of easy-to-use.

Figure 6:
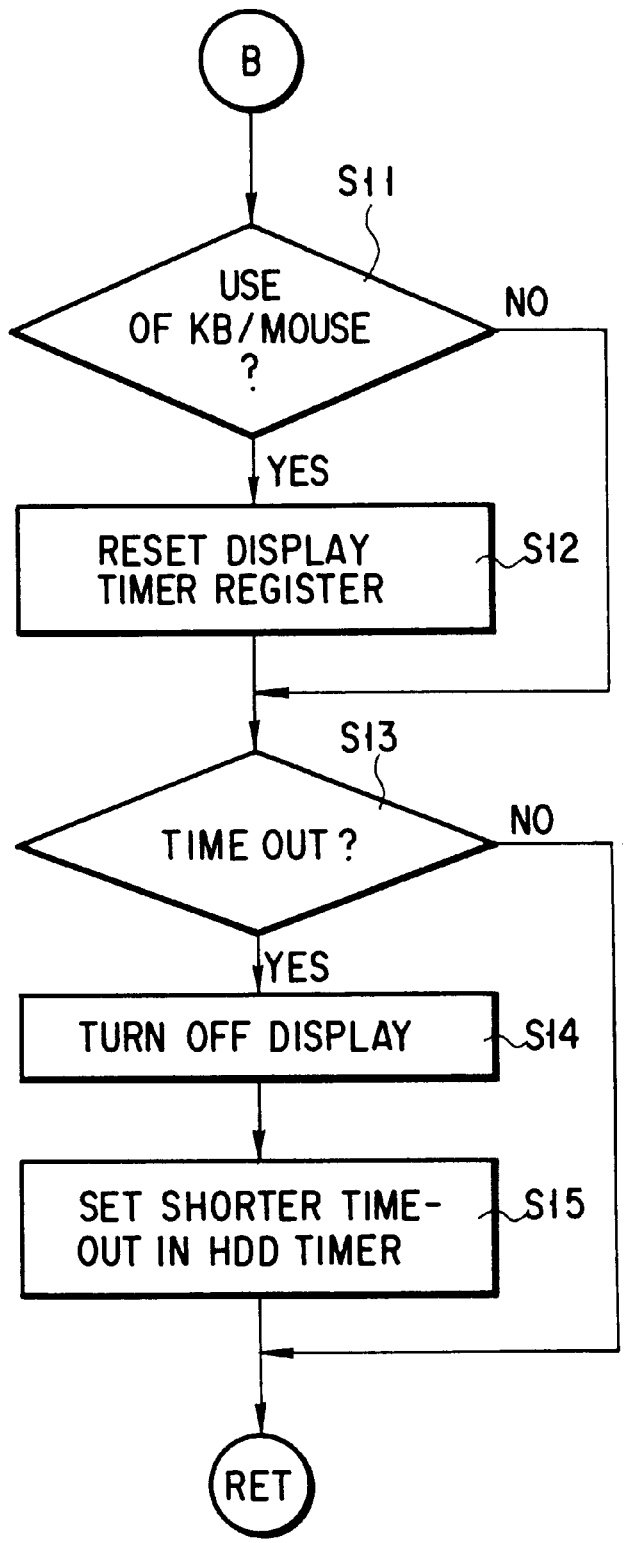
FIG. 6 is a flow-chart showing a processing procedure of the fourth embodiment according to the invention.

FIG. 6 is a flow-chart showing a processing procedure of the fourth embodiment according to the invention. A power saving operational function of the display provided by the operating system is monitored, and a generation of the display auto-off is determined as the system unused-condition, it can establish a short period of time-out of the HDD motor-off, with the result that it causes the power-saving effect to improve.

In the power-saving operational function of the display provided by the operating system, the input such as the key board, mouse and so forth are monitored, if there is no input during the period of established time, the auto-off of the display (for example, back-light-off) is performed. Since the generation of the auto-off of the display signifies the fact that the user does not operate the input operation during specific period of times, the probability of no access for HDD 17 is high. For this reason, in order to stop the disk driving motor 17M of the HDD as soon as possible, short period of time-out is set to the HDD timer register 22b.

FIG. 7 is a flow-chart showing a processing procedure of the fifth embodiment according to the invention. Here, after suppressing the influence to the convenience of extent of easy-to-use for the user, in order to lengthen the life of the battery as long as possible, the automatic stop period of time of the HDD is varied due to the remaining amount (remaining capacity) of the battery 19.

In the fifth embodiment, the micro processor (PS-MPU) 18 always monitors the remaining amount (remaining capacity) of the battery 19, and detects that the changes of the remaining amount battery from 100% state, 75% state, 50% state, to 25% state, causing the HDD-automatic-stop period of time to change in accordance with the detecting timing of the above each remaining amount. The shorter the HDD-automatic-stop period of time is, the more the effect of the power-saving is improved. The convenience for the extent of easy-to-use for the user is aggravated. While, the longer the HDD-automatic-stop period of time is, the less the effect of the power-saving is improved. The effect to the convenience for the extent of easy-to-use is diminished. For this reasons, when the battery remaining-amount is 100%, the automatic-stop period of time is lengthen, while the HDD-automatic-stop period of time is gradually shortened in proportion to reduction of the remaining amount.

Operations according to each of the above-described embodiments of the present invention will be described accompanying the drawings. Firstly, the operation of the first embodiment of the present invention will be described referring to FIGS. 1 and 2. Here, in addition to the conventional monitoring of the HDD-access executed, the use/non-use state of the system is monitored whether or not the user operates the input-device such as the key board (KB), the mouse (Mouse), or the pen (PEN). At this time, when it is recognized that the user employs the system, it is determined that the probability of the HDD-access is high. The HDD-timer register 22b is reset, so as not to automatically stop the disk driving motor 17M (restoring to the establishing condition of the initial value indicating the automatic-stop period of time).

In the first embodiment, in order to employ the HDD-timer register 22b as the HDD-timer for controlling of automatic stop of the disk driving motor 17M, "1" is set to the HDD- power-saving flag (HDD-PSF) 22a by the control of the CPU 10. For this reason, The HDD-timer register 22b is counted down by the timer 20 in which the predetermined automatic stop period of time is established as the initial value.

Each time the HDD 17 is in the read/write-access state, the above-described HDD-timer register 22b is reset, and returns to the initial value of the automatic-stop period of time (referring to FIG. 2, STEP S1, S2).

Further, each time the CPU 10 recognizes that the system is in the use state due to the user operating the input device such as the key board (KB), the mouse (Mouse), pen (PEN) and so forth, the above-described HDD-timer register 22b is reset on all such occasions, and returns to the initial value of the automatic-stop period of time (referring to FIG. 2, STEP S3, S4).

Consequently, when the user employs the system, it is determined that the probability of the HDD-access is high, and the HDD-timer register is reset, thereby as long as the user continues to perform the input operation, the disk driving motor 17M regularly rotates without automatic stop.

When the user inputs no more and the HDD timer register 22b is down-counted by the timer 20 to reach "0", the directive data of "motor-off" is set in the motor off register (DMOFF) 17b within the HDD 17 in response to the timer interrupt. In accordance with the directive data, the disk driving motor 17M is controlled so as to be automatically stopped (auto-off)(referring to FIG. 2, STEP S5, S6).

Even if the timer of the HDD motor-off is set shorter, the frequency of the HDD motor-off can be reduced by such a control if a user performs the interrupt operation. When the user performs no input operation (does not use the system), the motor-off timer with shortened set time can be used to quickly stop the disk driving motor 17M of the HDD 17, thereby saving the power consumption of the HDD 17.

The operation of the second embodiment of the present invention will be described referring to FIGS. 1, 3A, 3B, 4A, and 4B. In the second embodiment, as shown in FIG. 3A, and FIG. 4A, a motor driving speed down mode which aims at saving power by decreasing the driving speed of the disk driving motor 17M, intervenes between the idle mode after HDD accessing and the motor-off mode.

The motor-driving speed down mode is larger in its efficiency than the idle mode. The motor driving speed down mode prevents from drawbacks caused by restarting of the motor-off as described above. Power-saving effect is attained in such a way that the motor driving speed down mode is shifted during short timer period of time as the power-saving mode before entering the motor-off mode. In this embodiment, after 1 minute of the idle mode, it enters into a maximum period of time of 4 minutes of the motor driving speed down mode.

In this second embodiment, in order to employ the HDD-timer register 22b as the HDD-timer for controlling of slow speed control of the disk driving motor 17M, "0" is set to the HDD-power-saving flag (HDD-PSF) 22a by the control of the CPU 10. The HDD-timer register 22b is counted down by the timer 20 in which the predetermined driving speed controlling period of time (down-control) is established as the initial value.

As stated above, in the second embodiment of the present invention, since it causes the motor driving speed down mode to intervene between the idle mode and the motor-off mode, the power-saving effect is attained by the large effective mode rather than the idle mode preventing from wrong matter caused by restarting of the motor-off.

An operation according to the third embodiment of the present invention will now be described referring to FIGS. 1, 5A, and 5B. FIG. 5A is a timing chart showing a power-saving control according to the third embodiment of the present invention, and FIG. 5B is a timing chart showing the conventional power-saving control.

The power-saving control according to the third embodiment aims at saving power by shortening the period of time from HDD access to idle condition (automatic idle-time). Here, the power-saving effect is attained in such a way that it shorten the automatic idle period of time from 5 seconds to 1 seconds.

The mode in which the automatic idle-time is chosen correspondingly to the remaining capacity of the battery 19 (battery capacity) when the battery operates, or correspondingly to the condition when the system is used/unused. For example, when the battery capacity reduces less than 50%, it causes the automatic idle-period of time to shorten, or when the system is used-condition, the conventional automatic idle-period of time is selected, and so forth, thus by choosing the suitable selection, the power-saving effect is capable of being attained in more convenient condition for the extent of easy-to-use.

An operation according to the fourth embodiment of the present invention will now be described referring to FIGS. 1 and 6.

In this fourth embodiment, a power saving operational function of the display provided by the operating system is monitored, and a generation of the display auto-off is determined as the system-unused-condition, it can establish a short period of time-out of the HDD motor-off, with the result that it causes the power-saving effect to improve.

In the power-saving operational function of the display provided by the operating system, the input such as the key board, mouse and so forth are monitored, if there is no input during the period of established time, it causes the auto-off of the display (for example, back-light-off) to implement. Since the generation of the auto-off of the display signifies the fact that the user does not operate the input operation during specific period of times, the probability of no access for HDD 17 is high. For this reason, in order to stop the disk driving motor 17M of the HDD as soon as possible, short time-out period of time is established to the HDD timer register 22b.

When the user operates the input device such as key board (KB), the mouse (Mouse), the pen (PEN) and so forth so that the CPU 10 recognize that the system is used-condition, the display timer register 22c which is counted down by the timer 20, is reset, and the count value of the display timer register 22c returns to the display auto-off period of time which is previously established on all such occasions. (referring to FIG. 6, STEP S11, S12)

The user has stopped the input operation, before the HDD-timer register 22b is counted down by the timer 20, when the value of the HDD-timer register 22b becomes "0". At this time, the display power-saving register (DPR) 15 comes into the value, causing the power-saving to execute (on-state), and the display comes into the display auto-off (for example, back-light-off). (referring to FIG. 6, STEP S13, S14)

The period of time-out which is shorter than the normal period of time-out time is established to the HDD timer register 22b (referring to FIG. 6, STEP S15). If there is no input operation during the short period of time-out time which is established, the value of the HDD timer-register 22b comes into "0", at this time, due to the timer-interruption process, it is set the instruction data of motor-off to the motor-off register (DMOFF) 17b within the HDD 17, and the disk driving motor 17M is controlled so as to be automatically stopped (auto-off) in accordance with the instruction data.

Thus, the power saving operational function of the display provided by the operating system is monitored, and a generation of the display auto-off is determined as the system-unused-condition, it can establish the period of time-out which is shorter than the normal period of time-out to the HDD timer-register, with the result that it can impose improving of the power-saving effect.

An operation according to the fifth embodiment of the present invention will now be described referring to FIGS. 1 and 7. Here, after suppressing the influence to the convenience for the extent of easy-to-use for the user, in order to lengthen the life of the battery as long as possible, the automatic stop period 10 of time of the disk driving motor 17M within the HDD 17 is varied in accordance with the remaining amount (remaining capacity) of the battery 19.

In the fifth embodiment, the micro processor (PS-MPU) 18 always monitors the remaining amount (remaining capacity) of the battery 19, and detects that the changes of the remaining amount battery from 100% state, 75% state, 50% state, to 25% state (referring to FIG. 7, STEPs S21, S23, S25, S27), causing the HDD-automatic-stop period of time to change in accordance with the detecting timing of the above each remaining amount (referring to FIG. 7, STEPs S21, S24, S26, S28).

The shorter the HDD-automatic-stop period of time is, the more the effect of the power-saving is improved. The convenience for the extent of easy-to-use for the user is aggravated. While, the longer the HDD-automatic-stop period of time is, the less the effect of the power-saving is improved. The effect to the convenience for the extent of easy-to-use is diminished. For this reasons, when the battery remaining-amount is 100%, causing the automatic-stop period of time is lengthen, while the HDD-automatic-stop period of time is gradually shortened in proportion to reduction of the remaining amount, so that the extent of easy-to-use and the effect of the power-saving are capable of being improved.

Besides, the above described HDD power-saving control means according to each embodiment may be implemented not only by itself but also combined with arbitrary HDD power-saving control means.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A battery-drivable data processing apparatus provided with a hard disk drive having a motor rotation down mode driving a disk driving motor at a lower steed between an idle mode and a motor-ff mode, comprising:

means for monitoring a residual capacity of the battery when the apparatus is driven by the battery;

means for automatically ceasing a disk driving motor after an elapse of a certain set time after accessing the hard disk drive;

means for varying the set time for automatically ceasing the disk driving motor depending on a residual capacity of the battery when the hard disk drive is driven by the battery; and means for reducing the set time of the motor-off mode, the idle mode or the motor rotation down mode in units of a predetermined time period each time the residual capacity of the battery reduces at a predetermined rate.

2. A battery-drivable data processing apparatus provided with a hard disk drive having a motor rotation down mode driving a disk driving motor at a lower speed between an idle mode and a motor-ff mode, comprising:

means for monitoring a residual capacity of the battery when the apparatus is driven by the battery;

means for automatically ceasing a disk driving motor after an elapse of a certain set time after accessing the hard disk drive;

means for varying the set time of the idling mode depending on a residual capacity of the battery when the apparatus is driven by the battery; and means for reducing the set time of the motor-off mode, the idle mode or the motor rotation down mode in units of a predetermined time period each time the residual capacity of the battery reduces at a predetermined rate.

3. A battery-drivable data processing apparatus, comprising:

a hard disk drive having a motor rotation down mode driving a disk motor at a lower speed between an idle mode and a motor-off mode;

means for monitoring a residual capacity of a battery when the apparatus is driven by the battery;

means for varying the set time of the motor rotation down mode depending on a change of the residual capacity of the battery when the apparatus is driven by the battery; and means for reducing the set time of the motor-off mode, the idle mode or the motor rotation down mode in units of a predetermined time period each time the residual capacity of the battery reduces at a predetermined rate.

4. A battery-drivable data processing apparatus, comprising:

a hard disk drive having a motor rotation down mode driving a disk driving motor at a lower speed between an idle mode and motor-off mode;

means for monitoring a residual capacity of the battery when the apparatus is driven by the battery;

means for varying the set times of the idle mode and the motor rotation down mode depending on the residual capacity of the battery when the apparatus is driven by the battery; and means for reducing the set time of the motor-off mode, the idle mode or the motor rotation down mode in units of a predetermined time period each time the residual capacity of the battery reduces at a predetermined rate.

\* \* \* \* \*

UNITED STATES PATENT AND TRADEMARK OFFICE
CERTIFICATE OF CORRECTION

PATENT NO. : 5,907,713
DATED : May 25, 1999
INVENTOR(S) : Chenchao Chen et al.

It is certified that error appears in the above-identified patent and that said Letters Patent is hereby corrected as shown below:

Title Page, Item [57], in the Abstract, line 3, "predetermine" should read --predetermined--.

Claim 1, Col. 13, line 1, "steed" should read --speed--.

Claim 4, Col. 14, line 21, before "motor-off", insert --a--.

Signed and Sealed this

Nineteenth Day of September, 2000

Q. TODD DICKINSON

Attest:

Attesting Officer

Director of Patents and Trademarks